United States Patent
Virushabadoss et al.

(10) Patent No.: US 9,344,563 B2
(45) Date of Patent: May 17, 2016

(54) SYSTEM FOR AND METHOD OF RECYCLING NUMBERS SEAMLESSLY

(71) Applicant: Verizon Patent and Licensing Inc., Basking Ridge, NJ (US)

(72) Inventors: Kunthunathan Virushabadoss, Chennai (IN); Jithesh C. Parambath, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 14/031,983

(22) Filed: Sep. 19, 2013

(65) Prior Publication Data

US 2015/0078540 A1  Mar. 19, 2015

(51) Int. Cl.
*H04M 3/42* (2006.01)
*H04M 3/436* (2006.01)
*H04M 3/02* (2006.01)

(52) U.S. Cl.
CPC .............. *H04M 3/436* (2013.01); *H04M 3/02* (2013.01); *H04M 3/4228* (2013.01)

(58) Field of Classification Search
CPC .......... H04M 3/42; H04M 3/54; H04M 15/06
USPC ................. 379/88.19–88.21, 213.01, 211.02, 379/88, 379/88.14
See application file for complete search history.

(56) References Cited

U.S. PATENT DOCUMENTS

| | | | |
|---|---|---|---|
| 6,317,484 B1* | 11/2001 | McAllister | 379/88.02 |
| 2006/0126810 A1* | 6/2006 | Wilson | H04M 3/4874 379/142.01 |
| 2007/0041521 A1* | 2/2007 | Korah et al. | 379/88.14 |
| 2010/0054443 A1* | 3/2010 | Bhattiprolu | H04M 3/436 379/211.02 |
| 2014/0162610 A1* | 6/2014 | Scully | H04W 8/28 455/414.1 |
| 2014/0192969 A1* | 7/2014 | Brown | H04M 3/54 379/213.01 |

* cited by examiner

*Primary Examiner* — Van D Huynh

(57) ABSTRACT

Systems and methods for recycling contact numbers are presented. A service provider receives a disconnect request for a device associated with a contact number. The system retrieves and stores the device's contact list and/or communication history. One or more messages are created and stored. The contact number is placed in a pool of recycled numbers and mapped to the stored information, and may later be assigned to a second device. Subsequently, when a call is made over the service provider's network, the called number is compared with numbers in the pool. If a match is found, the system retrieves the stored contact list and/or communication history, and compares the calling number to numbers in the contact list and/or communication history. If a match is found, the system retrieves and plays the message to inform the calling party that the number they are trying to reach has been re-assigned.

18 Claims, 4 Drawing Sheets

SYSTEM FOR AND METHOD OF RECYCLING NUMBERS SEAMLESSLY

BACKGROUND INFORMATION

When a customer of a service provider of telephony services disconnects from that service, the telephone number or numbers associated with that customer's account (such as mobile and/or landline phone numbers) may be "recycled" and reassigned to other customers of the service provider (either new customers or existing customers that sign up for additional lines). However, the old customer may forget to inform family, friends, businesses, or other third parties in possession of the telephone number that he no longer uses that number. Accordingly, the customer that has been assigned the old customer's recycled number may receive unwanted calls from individuals and entities trying to reach the old customer. This may lead to bad user experiences, both for the customer associated with the reassigned number, and for those who call the reassigned number, expecting to reach the old customer.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
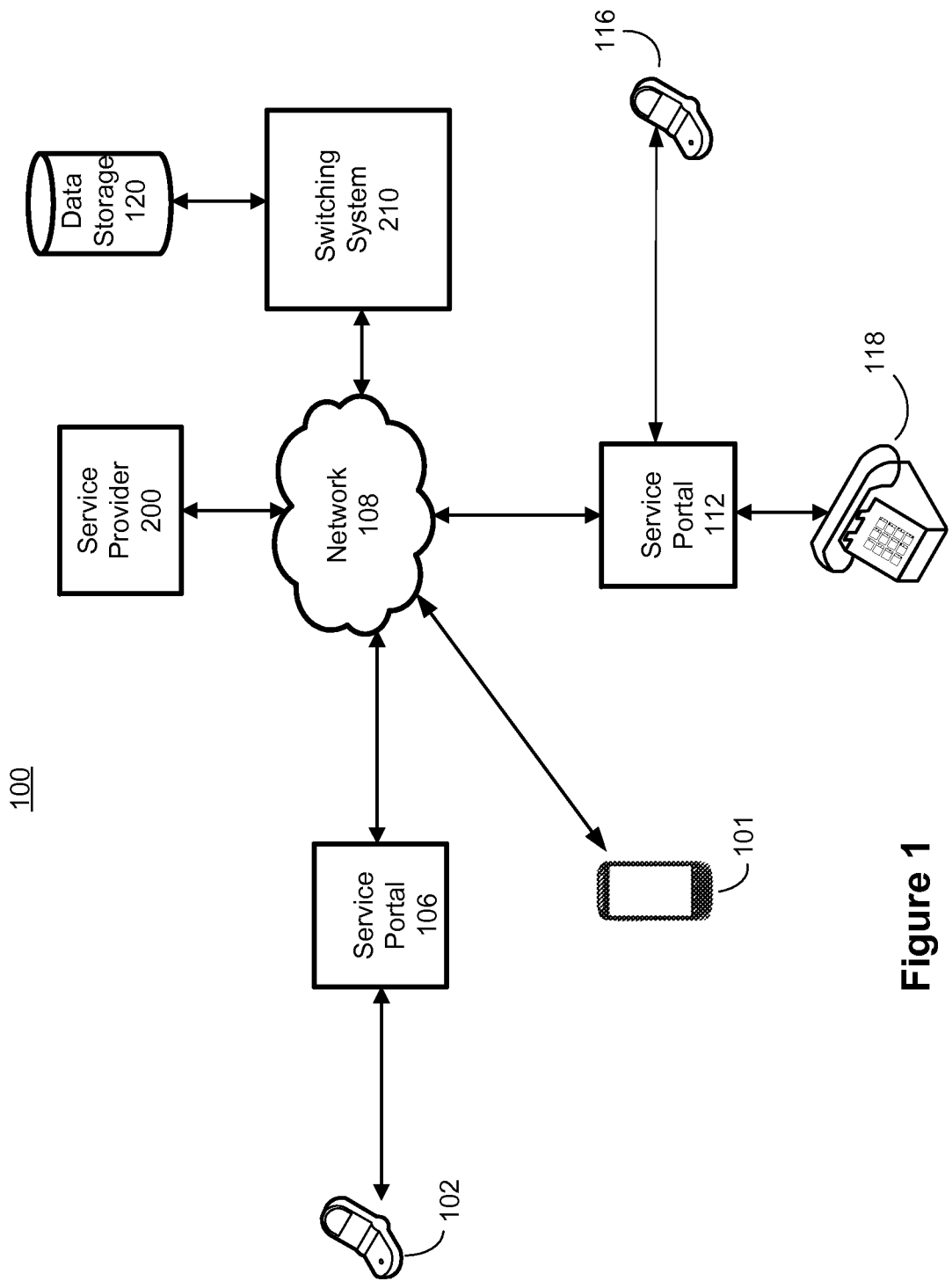
FIG. 1 is a schematic diagram illustrating a system according to a particular embodiment.

A system and method may include various embodiments for recycling contact numbers that were previously associated with customers. A customer of a service provider may want to switch carriers, switch numbers within the same carrier, and/or disconnect his phone service. The customer may contact the current service provider to have his service disconnected or phone number changed. The service provider may recycle the customer's number by placing it back into a pool of available numbers. One or more computer processors may be configured to retrieve a communication history of all communications that have either been placed to the disconnected number or made by the disconnected number over a certain time period. The computer processors may map the numbers in the communication history to the disconnected number in the pool of available numbers.

The one or more computer processors may be to configured allow the old customer to create a personalized message. The personalized message may be an audio, video, and/or text message configured to inform the recipient that the number they are trying to reach is no longer associated with the old customer. The personalized message may be mapped to the disconnected number in the pool of available numbers. The disconnected number may be assigned to a different customer. Subsequently, a friend or associate of the old customer may place a call to the number that has been assigned to the different customer—for example, if the old customer has not notified friends and associates about the number change.

The call may be routed to a system that determines that the called number has been recycled. The system may retrieve the list of numbers in the communication history that have been mapped to the recycled number and compare the numbers in the communication history to the calling number. If there is a match, the system may play the personalized message for the calling party. The personalized message may contain one or more instructions for the calling party, informing them how to reach the person they are trying to call. The calling party may then choose whether to continue with the call and be connected to the new customer. In this way, friends and associates of the previous customer intending to contact the previous customer may learn that the number is currently being used by a new customer, without disturbing the new customer and thereby maintaining the brand value of the service provider.

The description below describes communication modules, personalized messaging modules, routing modules, recycled numbers modules, user devices, service portals, service providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include user devices 101, 102, 116, and 118, service portals 106 and 112, a network 108, service provider 200, data storage 120, and switching system 210. Although elements of system 100 may be described as a single device, it will be appreciated that multiple instances of these devices may be included in system 100, such as, for example, multiple user devices, multiple service portals, multiple service providers, multiple data storages, multiple switching systems, and multiple networks. A user may be associated with user device 101, a second user may be associated with user device 102, a third user may be associated with user device 116, and a fourth user may be associated with user device 118. In other embodiments, the same user may be associated with multiple user devices.

Each user device may be assigned a unique identifier by service provider 200. The identifier may be in any format. The unique identifier may be permanently associated with the user device. For example and without limitation, it may be a telephone number, an E.164 Number Mapping ("ENUM") number, a mobile directory number (MDN), a mobile identification number (MIN), a Uniform Resource Identifier ("URI"), or any other suitable number, and/or any combination thereof. In various embodiments, the identifier may be a telephone number used to reach an IP device over an IP network. The user associated with user device 102, for example, may desire to make a call to the user associated with user device 101, and may use user device 102 to dial the number for user device 101.

User devices 101, 102, 116, and 118 may each be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. The user devices may be landline phones, such as user device 118. Also, user devices 101, 102, 116, and 118 may include one or more transmitters, receivers, and/or transceivers to transmit and/or receive one or more signals to and/or from other components depicted in FIG. 1, including, for example, service portals 106 and 112, and switching system 210.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Networks 108 may further include one, or any number of the exemplary types of networks mentioned above operating as a stand-alone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOW") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

The components depicted in FIG. 1 may be connected to network 108 via one or more service portals, such as service portals 106 and 112. Service portals may be, for example, but not limited to, a cellular telephone network signal tower, an Internet service provider router, a telephone adapter, a telephone router, a telephone exchange, an Ethernet router, a satellite router, a fiber optic router, a co-axial cable router, an Internet router, and/or other switching or routing device that may provide and/or determine a transmission path for data to travel. Such service portals may also include a computer, software, and/or hardware to facilitate a routing and/or forwarding function of a signal from a user device.

Data storage 120 may be network accessible storage and may be local, remote, or a combination thereof to the components depicted in FIG. 1. Data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 120 may be a database, such as an Oracle database, a Microsoft SQL Server database, a DB2 database, a MySQL database, a Sybase database, an object oriented database, a hierarchical database, or other database. Data storage 120 may utilize flat file structures for storage of data. Data storage 120 may be communicatively coupled to switching system 210, or to any other component depicted in FIG. 1. Any of the other components depicted in FIG. 1 may include one or more data storages as well.

Switching system 210 may include one or more devices, modules, and/or components for providing routing information for transmitting data over a network, such as, for example, an IP network and/or a PSTN. For example, switching system 210 may be part of, or communicatively coupled to, service provider 200, and may receive a request to provide routing information for establishing a call between user device 102 and user device 116. Switching system 210 may include one or more computer systems and/or processors to provide routing services. Switching system 210 may include a communication module, a personalized messaging module, a routing module, and a recycled numbers module, as described herein in reference to FIG. 2. Also, in various embodiments, switching system 210 may be a resolution server or may be a module of, or communicatively coupled to, a Domain Name System ("DNS") server, such as a BIND server, for converting host names and domain names into IP addresses over the Internet. Switching system 210 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

Figure 2:
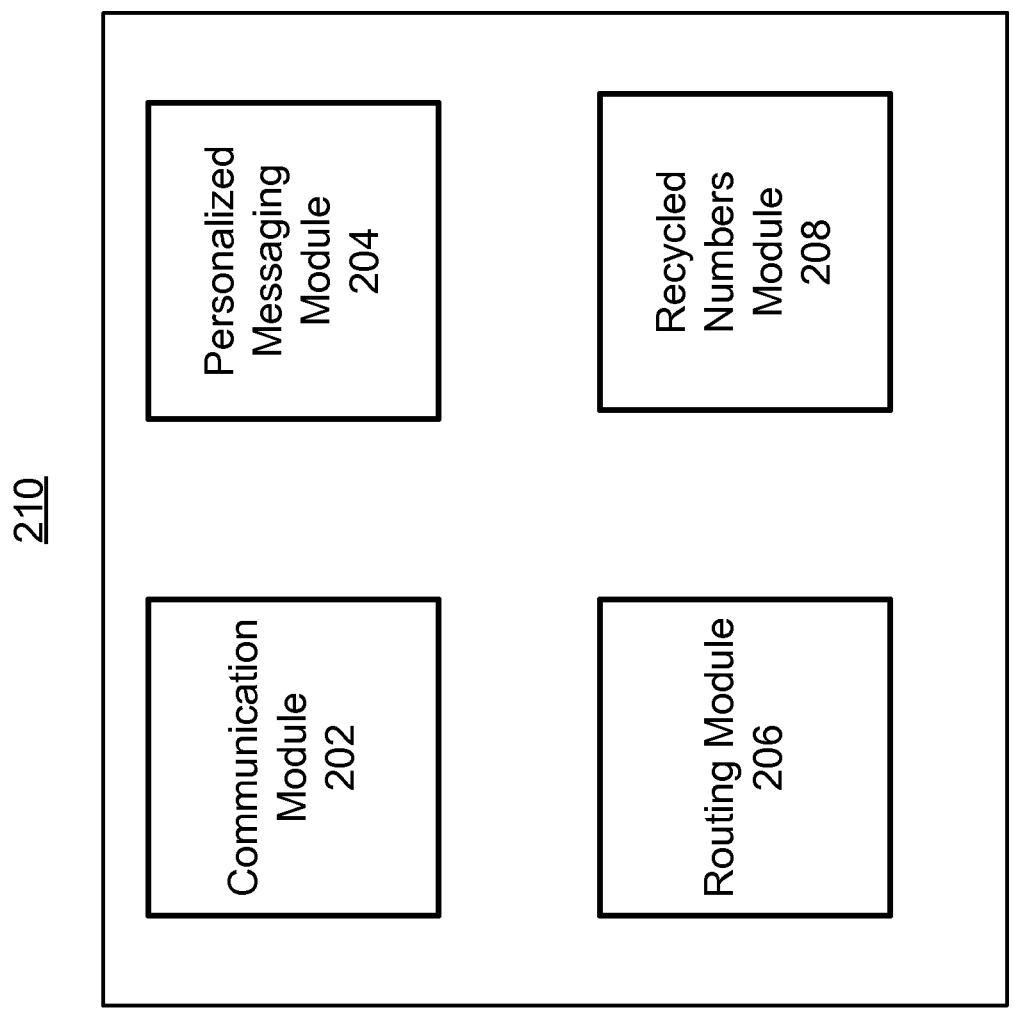
FIG. 2 is a schematic diagram of a hardware component of the system of a particular embodiment.

FIG. 2 is a block diagram of a hardware component of an exemplary embodiment of switching system 210. For example, switching system 210 may include a communication module 202, a personalized messaging module 204, a routing module 206, and a recycled numbers module 208. It is noted that modules 202, 204, 206, and 208, are exemplary and the functions performed by one or more of the modules may be combined with that performed by other modules. The functions described herein as being performed by modules 202, 204, 206, and 208 may also be separated and may be performed by other modules at devices local or remote to switching system 210. The modules may each be a computer program or an appropriately programmed computer, such as a mainframe or personal computer, or may include a plurality of such computers cooperating to perform the functionality described herein. Modules 202, 204, 206, and 208 may also communicate with data storage 120. Modules 202, 204, 206, and 208 may also be coupled to or integrated with switching system 210 or service provider 200. For example, modules 202, 204, 206, and 208 may be external devices that are wirelessly coupled and/or communicatively coupled to switching system 210 via an interface port which may include, without limitation, USB ports, system bus ports, or Firewire ports and other interface ports. Further, computer code may be installed on switching system 210 to control and/or operate a function of communication module 202, personalized messaging module 204, routing module 206, and/or recycled numbers module 208.

It is well known that users may want to switch service providers for various reasons, such as to obtain cheaper or better service. Users may want to switch numbers within a service provider. When a user changes service providers or moves to a different geographic area, the user device's unique identifier, such as a telephone number, may be "recycled" by the user's old service provider and assigned to a different user. However, the new user with the recycled number may still receive calls or other communications from individuals trying to contact the old user.

As depicted in FIGS. 1 and 2, the user associated with user device 101, for example, may want to disconnect his service, and/or switch service providers and receive a new telephone number for user device 101. For example, number (123) 456-7890 may be in the address space belonging to service provider 200 and may have been given out to the user associated with user device 101 by service provider 200. The user associated with user device 101 may notify service provider 200 that he wishes to disconnect or change his service. The user may access one or more websites provided by service provider 200 for disconnecting or canceling his service. When service provider 200 determines that user device 101 wishes to disconnect his service, service provider 200 may connect user device 101 to switching system 210.

Communication module 202 of switching system 210 may provide one or more graphical user interfaces for the user associated with user device 101. Communication module 202 may interact with user device 101 via one or more websites hosted by service provider 200 and/or switching system 210. Communication module 202 may prompt user device 101 for the number associated with user device 101. User device 101 may provide the number—(123) 456-7890. Communication module 202 may transmit the number to recycled numbers module 208. Recycled numbers module 208 may store the number in a pool of recycled numbers, and flag it as a recycled number. As used herein, the term "recycled number" means a contact number from a service provider that was previously associated with a customer of the service provider, but is no longer associated with that customer.

Each number in the pool of recycled numbers may be stored there for a period of time. The period of time may depend on the number. The user previously associated with the recycled number may designate the period of time that the recycled number will be stored in the pool. The service provider may designate the period of time. The period of time may be 1 year. After the period of time expires, the recycled number may be removed from the recycled number pool.

Communication module 202 may request that user device 101 upload its contact list. The user associated with user device 101 may have a contact list or address list of phone numbers and/or email addresses stored on user device 101, or stored on an external device. User device 101 may upload the address list or contact list to communication module 202. The address list or contact list may be uploaded as one or more files. Communication module 202 may store the address list or contact list in data storage 120. Recycled numbers module 208 and/or communications module 202 may map the recycled number stored in the pool to the address list or contact list stored in data storage 120. "Mapping the recycled number" may mean storing one or more pointers with the recycled number, wherein the pointers point to locations in data storage 120 where the corresponding contact list is stored. In other embodiments, the user associated with user device 101 may provide a contact list from one or more social networking sites where the user has an account or profile. Non-limiting examples of social networking sites include Facebook, Google+, LinkedIn, Twitter, and Flickr.

In another exemplary embodiment, the user associated with user device 101 may choose not to upload his contact list to communication module 202—for example, if a user does not want to provide a contact list for privacy reasons. Communication module 202 may retrieve a communication history for the recycled number automatically from service provider 200. The communication history may comprise a list of all communications that the user device 101 has made and/or received over a certain time period. A communication may be a phone call, a text message, SMS, MMS, or other similar form of communication. The communication history may include the contact number associated with the source and/or recipient of each communication. The communication history may include the email address or IP address associated with the source and/or recipient of each communication (for example, if a call was made to user device 101 using a Voice over IP (VOIP) equipped phone or computer). The communication history may include a date and time associated with each communication.

The user associated with user device 101 may specify the period of time that the communication history should cover. Communication module 202 may retrieve the communication history for the recycled number spanning the specified period of time. Communication module 202 may be programmed to automatically retrieve user device 101's communication history for the past month, past three months, past six months, year, or other period of time. Communication module 202 may retrieve user device 101's communication history even if user device 101 chooses to upload a contact list.

In other embodiments, communication module 202 may allow the user to specify the period of time based on the type of communication. For example, communication module may retrieve the communication history for all text messages sent to or from user device 101 from the past 3 months, while retrieving the communication history for all calls made to or from user device 101 for the past 6 months.

Communication module 202 may store the retrieved communication history in data storage 120. Recycled numbers module 208 and/or communications module 202 may map the recycled number (previously associated with user device 101) to the communication history stored in data storage 120.

Personalized messaging module 204 may be configured to create one or more personalized messages for the user associated with user device 101. Communication module 202 may provide one or more graphical user interfaces for user device 101 to customize a personalized message. The personalized message may be an audio recording, created by the user associated with user device 101. The personalized message may be a video recording. The personalized message may be designed to play back on a user device, such as user device 102, user device 116, or user device 118. The personalized message may be a text-based message. The personalized message may inform a calling party that the user associated with the recycled number no longer uses that number. The personalized message may include a description of a new telephone number for the user associated with user device 101. The personalized message may state the name of the customer that has been assigned the recycled number.

Personalized messaging module 204 may automatically create one or more default messages. The user associated with user device 101 may be allowed to select one or more default messages using communication module 202. One default message may be a voice message that states "The number you are attempting to call is no longer assigned to 'X'. It is now being used by 'Y'. If you are attempting to reach Y, please stay on the line." "X" may be the name of the user associated with user device 101. "Y" may be the name of the user who has been assigned the recycled number previously associated with user device 101. In other embodiments, the recycled number previously associated with user device 101 may not have been reassigned. In this case, the personalized message may simply state that the recycled number is no longer associated with user device 101. In other embodiments, the new user of the recycled number may not wish to be identified, and the default message may simply state that the number has been reassigned.

Personalized messaging module 204 may include several options in the personalized message and/or default message, requesting a response from the calling party. Personalized messaging module 204 may create a message that informs the calling party that the user associated with user device 101 no longer uses the called number. For example, the personalized message may then request the calling party "press 1" to continue the call and be connected to the new customer that is now using the recycled number. To select the desired call option, the calling party may use a key on a keypad (e.g., depress a key, scroll a wheel, etc.), may use a button on a side of the user device, may speak a selection, may use a motion (e.g., the calling user device may include a gyroscope or other motion detector to detect when the calling party moves the calling device a certain angle, or shakes, swings, maneuvers, and/or otherwise moves the calling device, etc.), or may use other manners of selecting between the different call options.

Personalized messaging module 204 may store the one or more personalized messages or default messages in data storage 120 and map them to the recycled number in the pool at recycled numbers module 208. Personalized messaging module 204 may associate an expiration date and/or time with each of the personalized messages or default messages. For example, the personalized message may only be valid for the next three months. At the end of the expiration date and/or time, the personalized messaging module 204 may delete the personalized message from data storage 120. The user associated with user device 101 may set an expiration date and/or time independently for each personalized message.

The user associated with user device 101 may record multiple messages or select multiple default messages and assign them to different numbers in user device 101's contact list. For example, user device 101 may record one message to be played for calls received from family members, and a different message to be played for calls received from co-workers. The user associated with user device 101 may assign different messages to be played based on the number of calls received from the user's contact list and/or communication history after the user's number is recycled. For example, personalized messaging module 204 may store message A with a counter indicating that message A is to be played for the first 10 calls made to the number previously associated with user device 101 (if those calls originate from a number in the communication history or contact list for user device 101). Once 10 calls have been received, messaging module 204 may delete message A. Messaging module 204 may store message B indicating that message B is to be played for the next 10 calls received for the number previously associated with user device 101. In other non-limiting embodiments, message A may be played for the first 30 days after the number associated with user agent 101 is recycled, while message B may be played for the next 30 days after message A expires. In other embodiments, the number of calls and/or time period for each message may be dependent on the type of communication and/or the relationship between the sender/caller and receiver/callee (e.g., friends or contacts may receive the message for shorter amount of time than business connections).

Personalized message module 204 or the user associated with user device 101 may assign different personalized or default messages to be played depending on the type of communication received. In one embodiment, one personalized message may be designated to respond to phone calls, another may be selected to respond to text messages.

Personalized messaging module 204 may store the one or more personalized messages and/or default messages in data storage 120 and map them to the recycled number in the pool associated with recycled numbers module 208. Recycled numbers module 208 may be configured to assign the one or more recycled numbers to a new user device. For example, the user associated with user device 116 may request a new number or new line from service provider 200. Service provider 200 may communicate with recycled numbers module 208 and assign a number stored in the pool of recycled numbers to user device 116. When a recycled number is assigned to a new user device, recycled numbers module 208 may retrieve data associated with the new user from service provider 200. Recycled numbers module 208 may retrieve the user's name, email address, address, and other contact information associated with the new user of the recycled number. Recycled numbers module 208 may update the one or more personalized messages stored in data storage 120 (that were mapped to the recycled number) to include the name of the user associated with user device 116 (i.e., the user device that has been assigned the recycled number). For example, recycled numbers module 208 may update the stored personalized messages and/or default messages to include a voice recording stating that "the number you are calling has been assigned to [the user associated with user device 116]. If you would like to continue, please press '1' or stay on the line."

Routing module 206 may receive communication information associated with a communication made to a recycled number, compare the calling party's number to the communication history and/or contact list associated with the recycled number, and play back one or more personalized messages or default messages based on the comparison. For example, user device 101 may have disconnected service from service provider 200. The telephone number associated with user device 101 may have been placed in the recycled numbers pool associated with recycled numbers module 208. The user associated with user device 101 may have created one or more personalized messages and personalized messaging module 204 may have stored them in data storage 120 and mapped them to the recycled number. The user associated with user device 101 may have provided one or more contact lists to communication module 202, which may have stored them in data storage 120 and mapped them to the recycled number. Communication module 202 may have retrieved user device 101's communication history from service provider 200, stored the communication history in data storage 120, and mapped the communication history to the recycled number in the recycled numbers pool associated with recycled numbers module 208.

In some embodiments, the user associated with user device 101 may have provided personalized message module 204 with their new contact number. In this case, the message may include the user's new contact number.

The user associated with user device 116 may request service from service provider 200. Service provider 200 may assign the recycled number (previously associated with user device 101) to user device 116. In one example, the user associated with user device 102 may be an acquaintance of the user associated with user device 101. The telephone number for user device 102 may be one of the numbers in the communication history or contact list that was previously associated with user device 101.

The user associated with user device 102 may dial the number previously associated with user device 101. In this example, assume the recycled number (previously associated with user device 101) is (123) 456-7890. This number may have been assigned to user device 116 (unbeknownst to the user associated with user device 102).

Service portal 106 may direct the call from user device 102 to network 108. Routing module 206 may receive the communication information for the call, which may include the called number (123) 456-7890. The communication information may include the telephone number associated with user device 102 (the calling party). Routing module 206 may temporarily interrupt the normal call flow and provide the communication information to recycled numbers module 208. Recycled numbers module 208 may compare the called number to one or more numbers in the pool of recycled numbers. Recycled numbers module 208 may determine that the called number matches one of the numbers in the pool of recycled numbers. In other examples, if no match is found between the called number and the pool of recycled numbers, routing module 206 may direct the call to user device 116 via network 108 and service portal 112.

Recycled numbers module 208 may determine that the called number (123) 456-7890 matches a number in the pool of recycled numbers. Recycled numbers module 208 may signal routing module 206 that the called number matches a recycled number. Routing module 206 may provide the called number to data storage 120. Routing module 206 may use the called number to retrieve the information that has been mapped to the recycled number (the called number) in data storage 120. The mapped information may include a contact list, a communication history, and/or one or more personalized messages or default messages. Routing module may retrieve the contact list and/or the communication history.

Routing module 206 may compare the calling number to the numbers found in the communication history and the contact list.

Continuing with the previous example, assume that user device 102 had previously called user device 101 while the (now) recycled number was still associated with user device 101 (i.e., before user device 101 had disconnected from service provider 200). User device 102's number may be included in the communication history for user device 101, which would have been received by communication module 202 and mapped to the recycled number when user device 101 disconnected or ended his service with service provider 200 (as described above). Thus, when routing module 206 compares the numbers in the communication history to the calling number of user device 102, routing module 206 may find a match. Based on this match, routing module 206 may retrieve one or more personalized messages or default messages stored in database 120 that have been mapped to the called number ((123) 456-7890). Routing module 206 may play, transmit, and/or stream the one or more personalized messages or default messages for playback to user device 102. Routing module 206 may select the personalized message and/or default message based on the calling number of user device 102, the date and time of the call, the expiration date and time associated with the personalized message and/or default message, the type of communication (call, text, SMS, etc.) and other factors as described above.

The personalized message may be an audio recording, a video recording, a text message, or a combination of the above. The personalized message may be provided to user device 102. The personalized message may be streamed to user device 102 over network 108 from messaging module 204. The personalized message may be provided to user device 102 in the same way an audio voicemail is provided. The personalized message may be downloaded onto user device 102, which may play the message for the user. The personalized message may inform user device 102 that user device 101 is no longer associated with the called number. The personalized message may information user device 102 that user device 116 is now associated with the called number. The personalized message may provide user device 102 with user device 101's new contact number. The personalized message may solicit a response from user device 102, such as whether user device 102 wishes to continue the call and connect with user device 116.

The user associated with user device 102 may respond by pressing one or more keys on a keypad associated with user device 102. The response may be a vocal confirmation from the user associated with user device 102 that he wishes to proceed with the call. The response may be a vocal indication from the user associated with user device 102 that he does not wish to proceed with the call. Routing module 206 may receive the response from user device 102. In other embodiments, if no response is received after a predetermined period of time, routing module 206 may automatically route the call to user device 116. In other embodiments, if no response is received after a predetermined time (e.g., 30 seconds), routing module may stop the call from being routed to user device 116.

Routing module 206 may route the call from user device 102 to user device 116 depending on the response from user device 102. For example, if user device 102 responds in a way that indicates that the user associated with user device 102 wishes to proceed with the call, routing module 206 may provide routing information to service provider 200, service portal 112, network 108, or other routing devices in order to connect user device 102's call with user device 116. If user device 102 responds in a way that indicates that the user associated with user device 102 does not wish to proceed with the call, routing module 206 may end the call (i.e., by not routing the call to user device 116). In this way, calls to user device 116 may be screened for callers who may be trying to contact user device 101.

In some embodiments, if the user associated with user device 101 previously provided personalized message module 204 with their new contact number, routing module 206 may route the call to the user associated with user device 101's new contact number. In this case, the message may solicit a response, such as "if you would like to be connected to [user associated with user device 101]'s new number, please press 2." If user device 102 selects this option, routing module 206 may route the call to user device 101's new number.

In another embodiment, the user associated with user device 102 may send a text message to the number previously associated with user device 101 ((123) 456-7890). As in the previous example, assume the recycled number (previously associated with user device 101) has been assigned to user device 116 (unbeknownst to the user associated with user device 102). As before, service portal 106 may direct the text message from user device 102 to network 108. Routing module 206 may receive the communication information, which may include the text message recipient number (123) 456-7890. The communication information may include the telephone number associated with user device 102 (the texting party). Routing module 206 may provide the communication information to recycled numbers module 208. Recycled numbers module 208 may compare the text message recipient number to the pool of recycled numbers. Recycled numbers module 208 may determine that the texted number matches one of the numbers in the pool of recycled numbers. In other examples, if no match is found, routing module 206 may direct the text message to user device 116 via network 108 and service portal 112.

Recycled numbers module 208 may determine that the texted number (123) 456-7890 matches a number in the pool of recycled numbers. Recycled numbers module 208 may signal routing module 206 that the texted number matches a recycled number. Routing module 206 may provide the texted number to data storage 120. Routing module 206 may use the texted number to retrieve the information that has been mapped to the recycled number (the texted number) in data storage 120—as described above. Routing module may retrieve the contact list and/or the communication history. Routing module 206 may compare the number associated with user device 102 to the numbers found in the communication history and/or the contact list.

Continuing with the previous example, assume that user device 102 had previously called or texted user device 101 while the (now) recycled number was still associated with user device 101 (i.e., before user device 101 had disconnected from service provider 200). User device 102's number may be included in the communication history for user device 101, which would have been retrieved by communication module 202 and mapped to the recycled number when user device 101 disconnected or ended his service with service provider 200 (as described above). Thus, when routing module 206 compares the numbers in the communication history to the number of user device 102, routing module 206 may find a match. Based on this match, routing module 206 may retrieve one or more personalized messages or default messages stored in database 120 that have been mapped to the texted number ((123) 456-7890).

Routing module 206 may play, transmit, and/or stream the one or more personalized messages or default messages for playback to user device 102. Routing module 206 may select the personalized message and/or default message based on the number of user device 102, the date and time of the text message, the expiration date and time associated with the personalized message and/or default message, the type of communication (call, text, SMS, etc.) and other factors as described above.

The personalized message may be an audio recording, a video recording, a text message, or a combination of the above. The personalized message may be played for user device 102. The personalized message may be streamed to user device 102. The personalized message may be played on user device 102. The personalized message may inform user device 102 that user device 101 is no longer associated with the texted number. The personalized message may information user device 102 that user device 116 is now associated with the texted number. The personalized message may provide user device 102 with user device 101's new contact number. The personalized message may solicit a response from user device 102, such as whether user device 102 wishes to continue the call and connect with user device 116.

The user associated with user device 102 may respond by pressing one or more keys on a keypad associated with user device 102. The response may be a vocal confirmation from the user associated with user device 102 that he would like the text message to be transmitted to user device 116. The response may be a vocal indication from the user associated with user device 102 that he does not wish for the text message to be communicated to user device 116. Routing module 206 may receive the response from user device 102. In other embodiments, if no response is received after a predetermined period of time, routing module 206 may automatically transmit the text message to user device 116. In other embodiments, if no response is received after a predetermined time (e.g., 30 seconds), routing module may block the text message from being routed to user device 116, and inform user device 102 of this.

Routing module 206 may transmit the text message from user device 102 to user device 116 depending on the response from user device 102. For example, if user device 102 responds in a way that indicates that the user associated with user device 102 wants the text message to be transmitted, routing module 206 may provide routing information to service provider 200, service portal 112, network 108, or other routing devices in order to transmit the text message to user device 116. If user device 102 responds in a way that indicates that the user associated with user device 102 does not want the text message to be transmitted, routing module 206 may block transmission. In this way, calls to user device 116 may be screened for text messages that may be intended for user device 101.

In some exemplary embodiments, switching system 210 may include one or more override features. For example, in one exemplary embodiment, the new user associated with a recycled number (such as the user associated with user device 116 from the previous example) may provide his contact list to switching system 210 when user device 116 is assigned the recycled number (that was once assigned to user device 101). This process may be similar to how the user associated with user device 101 uploaded his contact list to switching system 210, as described previously. Subsequently, when a call is placed to the recycled number (now associated with user device 1116), routing module 206 may initially compare the communication information to the entries in user device 116's contact list (after determining that the called number is in the recycled numbers pool). If there is a match, routing module 206 may automatically route the call to user device 116 and bypass the other steps in switching system 210 (thus not playing or transmitting a personalized or default message). This would be helpful in situations where the user of user device 116 has one or more contacts in common with the user of user device 101, such as where the users are relatives or acquaintances.

In another embodiment, the users associated with user devices 101 and 116 may not own their respective devices (such as where the devices are company issued phones or computers). A third party, such as an employer may own the user devices. When a number is recycled and re-assigned from user device 101 to user device 116, the third party may have the option of overriding the features of switching system 210, create personalized messages to be played back or transmitted as described above, limit the contact numbers that can contact user device 116, and perform all the other functions performed by the user associated with user device 101 or user device 116.

In one exemplary embodiment, routing module 206 may keep track of the number of times a certain number has been used to call or text a recycled number, and set a limit on how many times the routing module will retrieve a personalized or default message to be played back or transmitted to the calling user device. For example, if the same user device continues to call a number even after it has been recycled (and the calling number matches with one of the numbers in the communication history and/or contact list mapped to the recycled number), routing module 206 may increment a counter each time it receives a communication from the calling number. Once the counter reaches a predetermined threshold value, routing module 206 simply route the call, without retrieving any personalized message or default message. In other embodiments, routing module 206 may prevent the communication from being routed. If the threshold value is 10, then the routing module 206 may not connect the eleventh call from a user device to a recycled number. The threshold value may be set by the routing module 206, the user associated with the recycled number, service provider 200, or some other entity.

Figure 3:
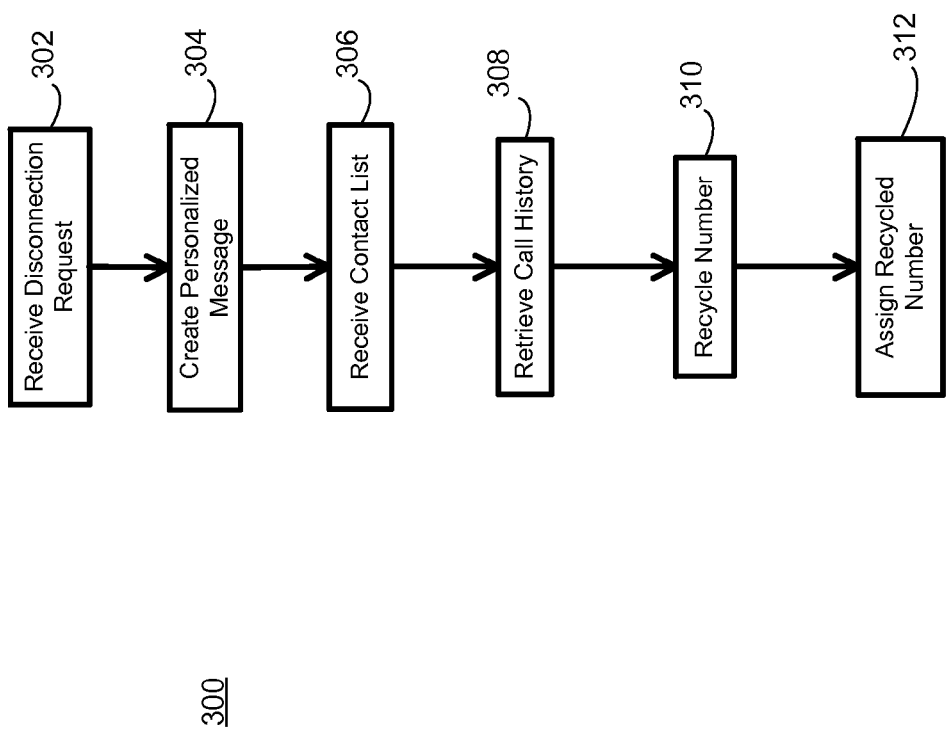
FIG. 3 is a block diagram of a method of a particular embodiment.

FIG. 3 is a flowchart illustrating the functionality of a particular embodiment. This method is provided by way of example, as there are a variety of ways to carry out the methods described herein. Method 300 shown in FIG. 3 may be executed or otherwise performed by one or a combination of various systems. The method 300 may be carried out through system 100 of FIG. 1 and/or the one or more modules shown in FIG. 2, by way of example, and various elements of FIG. 1 and FIG. 2 are referenced in explaining method 300 of FIG. 3. Each block shown in FIG. 3 represents one or more processes, methods, or subroutines carried out in method 300. Method 300 may begin at block 302.

At block 302, method 300 may receive a disconnection request. The disconnection request may be received from a user device associated with a user subscribing to telephony services from a service provider (such as service provider 200 in FIG. 1). Service provider 200 may provide one or interactive websites where a user may submit a disconnection request. The disconnection request may include a request to disconnect a user device from the service provider's network, or receive a different telephone number. The user device (such as user device 101) may provide its current number that will be recycled. In one example, a user named Joe Smith may submit a disconnect request to his telephone service provider. Joe Smith may have a mobile phone that has been assigned the number (987) 654-3210 by the service provider. Joe Smith may submit a disconnect request that includes this number. Method 300 may proceed to block 304.

At block 304, in response to receiving a disconnection request, method 300 may create one or more personalized messages. The personalized message may Joe Smith. If Joe Smith decides not to create a personalized message, the personalized message module 204 may select one or more default messages. The personalized messages and/or default messages may be an audio message, a video message, and/or a text message for playback to a user device. The personalized message may be recorded by a user (such as the user associated with user device 101) and uploaded to switching system 210 from the mobile phone in response to an indication at the mobile phone that the personalized message or messages have been finished. The personalized message or messages may be created by the user using an Interactive Voice Response (IVR) system provided by the user's service provider. The user may create the personalized message or messages using an online interface provided by the service provider. Continuing with the previous example, Joe Smith may submit a disconnect request. Joe Smith may record the following personalized message on his mobile phone: "Hi, this is Joe Smith. I no longer use this number. I can now be reached at . . . " Joe Smith may include a new contact number, email address, web address, etc. where he can be reached in the personalized message.

Switching system 210 and/or Service provider 200 may include interactive information in the personalized message. For example, personalized message module 204 may include the following information in Joe Smith's personalized message: "If you wish to proceed with this call, please press 1. Otherwise, please hang up." The personalized message may solicit one or more responses from a calling party (as will be described in connection with FIG. 4). The personalized message may be stored in data storage 120. Personalized message module 204 may do the same for default messages. The default message may state "The number you are trying to reach has been reassigned to another customer. If you would like to continue with this call, please press 1 or say 'Continue'". Method 300 may proceed to block 306.

At block 306, method 300 may receive the user device's contact list following the creation of the one or more personalized messages and/or default messages. Continuing with the previous example, Joe Smith may supply the contact list stored on his smart phone to switching system 210 and/or service provider 200. Communication module 202 may provide one or more graphical user interfaces where Joe Smith can upload the contact list stored on smartphone, or on an external device. The contact list may include the names, phone numbers, email addresses, and other information associated with one or more individuals associated with Joe Smith. The contact list may be stored in data storage 120. Method 300 may proceed to block 308.

At block 308, method 300 may retrieve the user device's communication history. The communication history may be supplied by service provider 200. The communication history may be supplied by a third party. The communication history may comprise a list of all calls that have been made to or from the user device associated with the user who submitted the disconnect request. The communication history may comprise a list of all text messages that have been sent or received by Joe Smith's smartphone. The communication history may span a certain time period. Joe Smith may select the time period. Switching system 210 may determine the time period. Continuing with the previous example, communication module 202 may retrieve the communication history associated with Joe Smith's telephone number (987) 654-3210. The communication history may include a list of each phone number that Joe Smith has called using his smart phone over the past three months. The communication history may further include a list of each phone number that has called Joe Smith in the last three months. The communication history may include a list of each phone number that has sent Joe Smith's phone a text message, SMS message, MMS message, or other text-based message. The communication history may include a list of each phone number that Joe Smith has sent a text message to (or SMS/MMS message, etc.). The time period may be three months. Other time periods may be used. The communication history may be stored in data storage 120. Communication module 202 may be preprogrammed to only pull numbers that are found more than once in the communication history. Another threshold may be specified (for example, the communications module 202 may only retrieve and store numbers from the communication history that show up a minimum of three times in the past month).

Continuing with the previous example, assume Joe has made two calls to the number (678) 901-2345 in the past month (prior to submitting the disconnect request). The number (678) 901-2345 may be included in the communication history for Joe's smartphone. The communication history for Joe's phone may be received from service provider 200 and saved in database 120. Method 300 may proceed to block 310.

At block 310, method 300 may then recycle the disconnected number. Recycled numbers module 208 may place the disconnected number in a pool of recycled numbers, where it is available to be assigned to a different customer of service provider 200. Recycled numbers module (or another module within switching system 210) may map the recycled number to the personalized message(s), communication history, and contact list stored in data storage 120. "Mapping" the recycled number may mean associating the recycled number with the stored communication history, contact list, and the one or more personalized messages.

Continuing with the previous example, Joe Smith's number—(987) 654-3210—may be placed in a pool of recycled numbers associated with recycled numbers module 208. One or more indicators may be stored with the recycled number that point to locations in data storage 120 where Joe Smith's contact list, communication history, and/or personalized message(s) are stored. This stored information will be associated with the number (987) 654-3210 in the recycled numbers pool.

In one exemplary embodiment, switching system 210 may allow Joe Smith to associate specific personalized messages with specific phone numbers from his contact list or communication history. For example, Joe Smith may have a specific message that he wants to be played for family members that may mistakenly call his old number that is now recycled. He may designate phone numbers associated with those family members in his contact list and/or communication history and select and/or create a specific personalized message that will be played for calls from those numbers. Method 300 may proceed to block 312.

At block 312, method 300 may assign the recycled number to a different customer or user of the service provider. Continuing with the previous example, a new user (Sarah Jones) may sign up for telephony services from service provider 200. Service provider 200 may retrieve an available number from the pool of recycled numbers and assign it to a user device used by Sarah Jones (such as an iPhone). Service provider 200 may assign Joe Smith's old number—(978) 654-3210—to Sarah Jones' iPhone.

Figure 4:
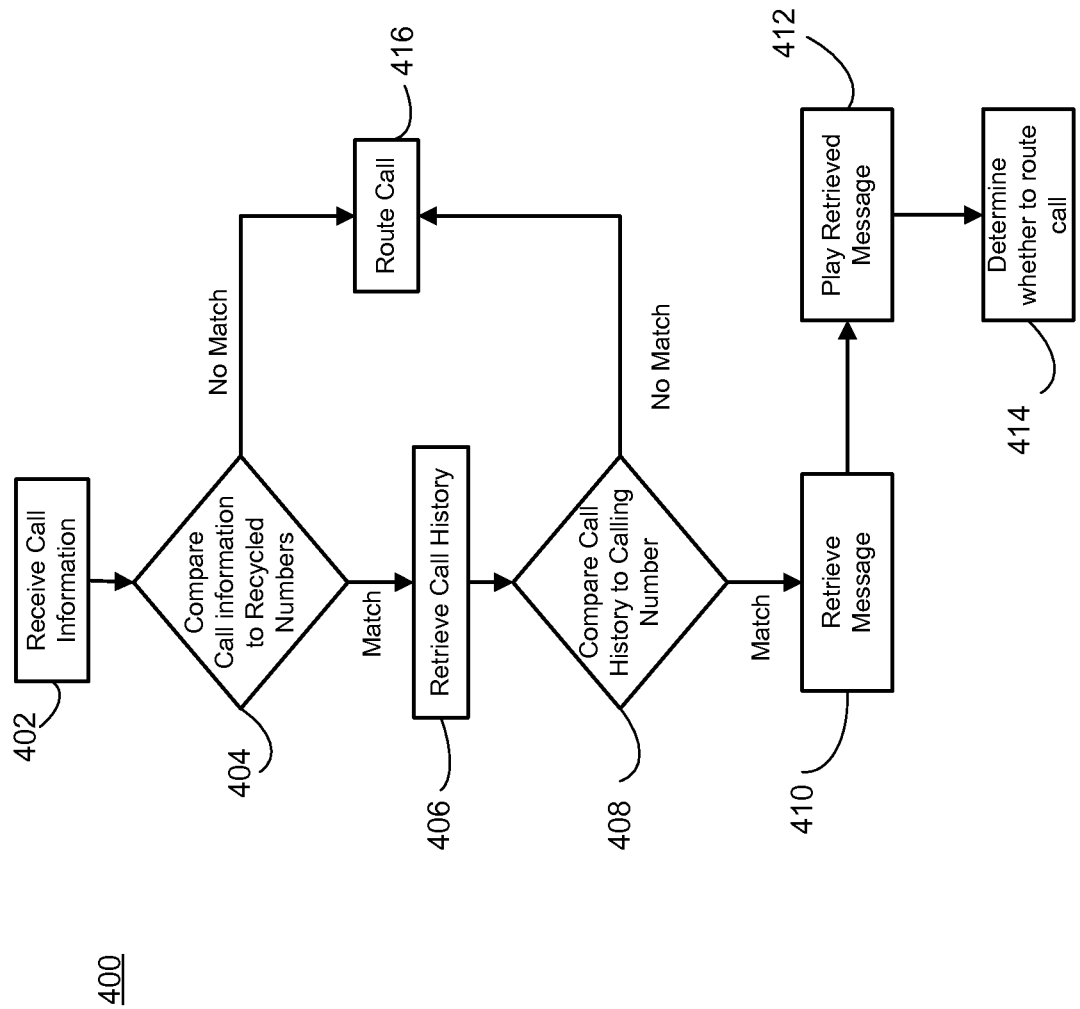
FIG. 4 is a block diagram of a method of a particular embodiment.

FIG. 4 is a flowchart illustrating the functionality of a particular embodiment. This method is provided by way of example, as there are a variety of ways to carry out the methods described herein. Method 400 shown in FIG. 4 may be executed or otherwise performed by one or a combination of various systems. The method 400 may be carried out through system 100 of FIG. 1 and/or the one or more modules shown in FIG. 2, by way of example, and various elements of FIG. 1 and FIG. 2 are referenced in explaining method 400 of FIG. 4. Each block shown in FIG. 4 represents one or more processes, methods, or subroutines carried out in method 400. Method 400 may begin at block 402.

At block 402, method 400 may receive communication information. The communication information may be received from a network, such as network 108. The communication information may be associated with a call from a user device to another user device. The communication information may include the number of the called party (for example, the number dialed by the calling party). The communication information may include the number of the calling party. In other embodiments, the communication information may be associated with a text message/SMS/MMS message from a user device to another user device. The communication information may include the email address of the calling or texting party, or an IP address associated with a VOW communication.

Continuing with the example from FIG. 3, the calling party may be Bob, who is associated with the number (678) 901-2345. Bob may not be aware that Joe Smith has changed phone numbers and/or service providers. Bob may be attempting to call Joe, and may dial Joe's old number—(987) 654-3210. Bob's call may be routed to network 108, and the communication information may be received by routing module 206. Method 400 may proceed to block 404.

At block 404, in response to receiving the communication information, method 400 may compare the received communication information with the recycled numbers in the recycled number pool. Routing module 206 may compare the called (or texted) number with the recycled numbers in the recycled numbers pool. Continuing with the previous example, routing module 206 may compare the called number (987) 654-3210 with the pool of recycled numbers associated with recycled numbers module 208. If the routing module finds a match, method 400 may proceed to block 406. If routing module 206 does not find a match, method 400 may proceed to block 416. Continuing from the previous example, Bob may dial Joe Smith's old number that has been recycled and assigned to Sarah Jones—(987) 654-3210. This recycled number may have been stored in the recycled numbers pool, and routing module 206 may determine that a match exists.

At block 406, if the routing module finds a match between the called (or texted) number and a number in the pool of recycled numbers, method 400 may retrieve the communication history for the recycled number. Method 400 may additionally or alternatively retrieve the contact list for the recycled number. The communication history and/or contact list may be retrieved from data storage 120, based on the recycled number identified in block 404. Continuing with the previous example, routing module 206 may retrieve the communication history and contact list associated with the recycled number (987) 654-3210. Method 400 may proceed to block 408.

At block 408, after retrieving the communication history and/or contact list for the called number, method 400 may compare the calling number with the numbers in the retrieved communication history. Method 400 may additionally or alternatively compare the calling number with the numbers in the retrieved contact list. The routing module 206 may perform the comparison. If the routing module finds a match, method 400 may proceed to block 410. If routing module 206 does not find a match, method 400 may proceed to block 416. Continuing with the previous example, the routing module 206 may determine that the calling number—(678) 901-2345—matches one of the numbers in the communication history that was mapped to the recycled number.

At block 410, if the calling number matches one or more numbers in the communications history or contact list, method 400 may retrieve one or more personalized messages and/or default messages. Routing module 206 may retrieve any personalized message(s) and/or default messages that were mapped to the recycled number in data storage 120. If multiple personalized messages are associated with the recycled number in data storage 120, routing module may determine which one to play or transmit based on the called number (for example, if Joe Smith had designated certain personalized messages to be played for certain callers). Routing module 206 may determine which message to play or transmit based on the type of communication. In other embodiments, each personalized message may be associated with an expiration date or time. In other embodiments, each personalized message may be associated with a time of day (for example, one personalized message may only be for calls received during business hours). In other embodiments, a personalized message may be associated with an area code (for example, one personalized message may only be played for calls received from the (925) area code). In other embodiments, different personalized messages may have been assigned to different calling numbers.

Continuing with the previous example, Joe Smith's personalized message stored in data storage 120 may be retrieved. Method 400 may proceed to block 412.

At block 412, method 400 may play a retrieved message (based on the factors listed above). The message may be an audio recording. The message may be played for the calling party (Fred). The message may state "You have reached a number that no longer belongs to Joe Smith. If you wish to continue with the call, press 1, or stay on the line." The message may be heard by Fred on his phone. In other embodiments, the message may be a text message transmitted to Fred's user device. In other embodiments, the message may be an email. In other embodiments, the message may be a video message that is transmitted or streamed to be played on Fred's user device. Method 400 may proceed to block 414.

At block 414, method 400 may determine whether to route the call. The determination may be made based on how the calling party responds to the personalized message. Continuing with the previous example, Fred may hear the message and then press "1" on his mobile phone. This response may be received by routing module 206. Routing module 206 may then provide routing information to network 108, service provider 200, service portal 112, or other routers and/or gateways, allowing Fred's call to be routed to Sarah Jones iPhone (the user device that is now associated with Joe Smith's old number). Fred may hear the message and stay on the line. Routing module 206 may be configured to automatically route the call to the called party if no response is received after a predetermined period of time. Fred may hear the message and hang up, thus ending the call.

At block 416, the call may be routed to the called party.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, such as the data storage 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-based system, comprising:
a communication processor that receives a request to disconnect a user device from a service provider, provides an interface to the user device wherein the interface requests a contact list associated with the user device, receives a response from the user device, receives at least one of a communication history from a database and the contact list from the user device based on the response from the user device, and stores the at least one of the communication history and the contact list associated with the user device in a data storage, wherein the user device is associated with a contact number;
a message processor that creates at least one message designed to be played on a second device and store the message in the data storage;
a recycling processor that stores the contact number in a pool of contact numbers, associates the contact number with the at least one of the communication history and the contact list, and associates the contact number with the stored message, wherein the pool of contact numbers stores one or more previously recycled numbers that are available to be assigned to a device similar to the user device or the second device; and
a routing processor that:
  receives communication information from an origination user device attempting to connect with a destination user device, wherein the communication information comprises a first number associated with the origination user device and a second number associated with the destination user device,
  performs a first comparison between the second number and the one or more previously recycled numbers stored in the pool of contact numbers, and if the first comparison indicates a match between the second number and at least one of the one or more previously recycled numbers stored in the pool of contact numbers, a determination is made that the second number is no longer associated with at least one user,
  based on the determination, retrieves the at least one of the communication history and the contact list from the data storage, perform a second comparison between the first number and the at least one of the communication history and the contact list, and
  if the second comparison indicates a match between at least part of the first number and at least part of at least one of the received contact list and the communication history, selects one of the at least one stored message, and provides the selected message to the origination user device, and
  if either the first or second comparison do not indicate a match, provides routing information to connect the communication from the origination user device to the destination user device without selecting or playing the at least one stored message.

2. The system of claim 1, wherein the at least one message is one of an audio message, a video message, or a text message.

3. The system of claim 2, wherein the at least one message is recorded by a user associated with the user device.

4. The system of claim 2, wherein the at least one message is a default message created by the message module.

5. The system of claim 1, wherein the routing processor selects one of the at least one stored message based on at least one of: the communication information, a date and time the communication information was received, a number of times the origination user device has previously attempted to connect with the destination user device, a number of times the stored message has been previously selected, or a type of communication associated with the communication information.

6. The system of claim 1, wherein the at least one message presents the origination user device with one or more selectable response options, wherein the one or more selectable response options comprise at least one of connect to the destination user device, leave a message for the destination user device, or end the communication.

7. The system of claim 6, wherein, if the routing processor provides the selected message to the origination user device, the routing processor provides routing information to connect the communication from the origination user device to the destination user device based on the response option selected by the origination user device.

8. The system of claim 7, wherein one of the one or more selectable response options is selected based on receiving an input at the origination user device, the input being one of a voice input, a selection of a key on a keypad, a button input, and a motion input.

9. The system of claim 1, wherein the second comparison comprises comparing the first number with one or more numbers in at least one of the contact list and communication history, wherein the routing module is configured to select and provide one of the at least one stored message if the first number matches at least one of the one or more numbers in at least one of the contact list and communication history.

10. A method, comprising:
receiving a request to disconnect a user device from a service provider, wherein the user device is associated with a contact number;
providing an interface to the user device, wherein the interface includes a request for a contact list associated with the user device;
receiving a response from the user device;
receiving at least one of a communication history from a database and the contact list from the user device based on the response from the user device;
creating at least one personalized message based at least in part on information received from the user device;
storing the at least one personalized message and the at least one of the communication history and the contact list;
storing the contact number in a pool of one or more previously recycled contact numbers after storing the at least one personalized message and the at least one of the communication history and the contact list;
associating the stored at least one personalized message and the at least one of the communication history and the contact list with the contact number;
assigning the contact number to a second device;

receiving communication information, wherein the communication information indicates an origination user device is attempting to contact a destination user device, wherein the communication information comprises a first contact number associated with the origination user device and a second contact number associated with the destination user device;

comparing the second contact number with the pool of the one or more previously recycled contact numbers, wherein if the second contact number matches at least one of the one or more previously recycled contact numbers, a determination is made that the second contact number is no longer associated with at least one user;

based on the determination, retrieving the at least one of the communication history and the contact list associated with the second contact number and comparing the first contact number with the at least one of the communication history and the contact list; and if the first contact number matches with at least one number in the at least one of the communication history and the contact list, retrieving the at least one personalized message associated with the second contact number, and providing the personalized message for the origination user device based on the results of the comparison.

11. The method of claim 10, wherein the at least one message is one of an audio message, a video message, or a text message.

12. The method of claim 11, wherein the at least one message is recorded by a user associated with the user device.

13. The method of claim 11, wherein the at least one message is a default message created by the service provider.

14. The method of claim 11, wherein the at least one message may include at least one of a name of a user of the user device, contact information associated with the user of the user device, a name of a user of the second device, and contact information associated with the user of the second device.

15. The method of claim 10, wherein the message is retrieved based on at least one of the first contact number, a date and time the communication information was received, a number of times the origination user device has previously attempted to connect with the destination user device, a number of times the message has been previously selected, and a type of communication associated with the communication information.

16. The method of claim 10, wherein the message presents the origination user device with one or more selectable response options, wherein the one or more selectable response options comprise at least one of connect to the destination user device, leave a message for the destination user device, or end the communication.

17. The method of claim 16, further comprising:
receiving a selection of one of the one or more selectable response options from the origination user device; and
determining whether to route the communication from the origination user device to the destination user device based on the response.

18. The method of claim 10, wherein the origination user device and destination user device each comprise one of a landline phone, a smartphone, a mobile phone, a laptop computer, a PDA, a desktop computer, or a tablet computer.

* * * * *